United States Patent
Lee et al.

(10) Patent No.: US 12,379,859 B2
(45) Date of Patent: Aug. 5, 2025

(54) STORAGE CONTROLLER MAPPING PHYSICAL FUNCTION TO VIRTUAL MACHINE AND METHOD OF OPERATING ELECTRONIC SYSTEM INCLUDING THE SAME

(71) Applicant: Samsung Electronics Co., Ltd., Suwon-si (KR)

(72) Inventors: Hanju Lee, Suwon-si (KR); Soogon Kim, Suwon-si (KR); Sungjune Youn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/527,244

(22) Filed: Dec. 2, 2023

(65) Prior Publication Data

US 2024/0311024 A1    Sep. 19, 2024

(30) Foreign Application Priority Data

Mar. 16, 2023    (KR) .......................... 10-2023-0034636

(51) Int. Cl.
*G06F 3/06* (2006.01)
(52) U.S. Cl.
CPC .......... *G06F 3/0631* (2013.01); *G06F 3/0604* (2013.01); *G06F 3/0656* (2013.01)
(58) Field of Classification Search
CPC ..... G06F 3/0631; G06F 3/0656; G06F 3/0604
See application file for complete search history.

(56) References Cited

U.S. PATENT DOCUMENTS

| | | | |
|---|---|---|---|
| 2013/0159557 A1* | 6/2013 | Bita | G06F 3/0604 710/6 |
| 2016/0034415 A1* | 2/2016 | Singh | G06F 13/28 710/313 |
| 2018/0004452 A1* | 1/2018 | Ganguli | H04L 41/5025 |
| 2020/0356396 A1* | 11/2020 | Bert | G06F 12/0246 |
| 2021/0004256 A1 | 1/2021 | Zhang et al. | |
| 2021/0132860 A1 | 5/2021 | Kou et al. | |
| 2021/0149697 A1 | 5/2021 | Jain et al. | |
| 2021/0240393 A1* | 8/2021 | Jo | G06F 3/0679 |
| 2021/0311665 A1 | 10/2021 | Maharana et al. | |
| 2022/0276887 A1 | 9/2022 | Bert | |
| 2022/0311594 A1 | 9/2022 | Kadam et al. | |
| 2022/0326879 A1 | 10/2022 | Benisty | |
| 2023/0074388 A1* | 3/2023 | Rao | G06F 3/0605 |

(Continued)

FOREIGN PATENT DOCUMENTS

KR    10-2021-0024195 A    3/2021

*Primary Examiner* — Mark A Giardino, Jr.
(74) *Attorney, Agent, or Firm* — Muir Patent Law, PLLC

(57) ABSTRACT

A storage controller for controlling a nonvolatile memory device is disclosed. The storage controller includes a buffer memory and a processor. The processor is configured to provide a plurality of physical functions having equivalent authorities to a host, and to allocate, in response to a resource allocation request received from the host via an arbitrary physical function among the plurality of physical functions, a namespace provided by the nonvolatile memory device and a buffer region included in the buffer memory to one or more target physical functions among the plurality of physical functions.

20 Claims, 11 Drawing Sheets

(56) References Cited

U.S. PATENT DOCUMENTS

| | | | | |
|---|---|---|---|---|
| 2023/0168934 A1* | 6/2023 | Vaka | ................... | H04L 67/1097 |
| | | | | 718/104 |
| 2024/0004561 A1* | 1/2024 | Benisty | ................ | G06F 3/0617 |
| 2024/0012578 A1* | 1/2024 | Lee | ....................... | G06F 3/0656 |

* cited by examiner

STORAGE CONTROLLER MAPPING PHYSICAL FUNCTION TO VIRTUAL MACHINE AND METHOD OF OPERATING ELECTRONIC SYSTEM INCLUDING THE SAME

CROSS-REFERENCE TO RELATED APPLICATION(S)

This application claims benefit of priority to Korean Patent Application No. 10-2023-0034636 filed on Mar. 16, 2023 in the Korean Intellectual Property Office, the disclosure of which is incorporated herein by reference in its entirety.

BACKGROUND

The present inventive concept relates to a storage controller and a method of operating an electronic system using a storage device.

A storage device such as a solid state drive (SSD) may include at least one nonvolatile memory to store data. A host may store data in a nonvolatile memory using a storage device.

Virtual machines may run on a single host. A storage device may abstract a physical storage space, and may provide virtual storage devices including the abstracted storage space to the virtual machines of the host. The virtual machines may access the virtual storage devices in the same manner as accessing a physical storage device. In order to improve the flexibility of resource allocation to the virtual storage devices, it is beneficial to reduce overhead of the storage device for resource allocation and to prevent a malicious user from diverting resources of the storage device.

SUMMARY

An aspect of the present inventive concept provides a method capable of reducing resource consumption required by a storage controller so as to provide virtual storage devices.

Another aspect of the present inventive concept provides a storage controller capable of providing consistent and stable performance to each of virtual storage devices.

According to an aspect of the present inventive concept, there is provided a storage controller for controlling a nonvolatile memory device. The storage controller includes a buffer memory, and a processor configured to provide a plurality of physical functions having equivalent authorities to a host, and to allocate, in response to a resource allocation request received from the host via an arbitrary physical function among the plurality of physical functions, a namespace provided by the nonvolatile memory device and a buffer region included in the buffer memory to one or more target physical functions among the plurality of physical functions.

According to another aspect of the present inventive concept, there is provided a storage controller including a buffer memory and a processor. The processor is configured to provide a plurality of physical functions to a host, to respectively allocate, in response to resource allocation requests received from the host via the plurality of physical functions, buffer regions having a size proportional to target quality of service (QOS) from the buffer memory to the plurality of physical functions, to monitor actual QoS of the plurality of physical function, and to dynamically change sizes of the buffer regions, respectively allocated to the plurality of physical functions, according to whether target QoS of each of the plurality of physical functions is ensured as a result of the monitoring.

According to another aspect of the present inventive concept, there is provided a method of operating an electronic system. The method includes identifying a storage device and acquiring information about an amount of resources of the storage device, enumerating activated physical functions provided by the storage device, mapping each of the activated physical functions to at least one virtual machine, providing a resource allocation authority to the at least one virtual machine within a range of a resource budget for each of the activated physical functions, and providing, by the at least one virtual machine, a resource allocation request for setting a storage capacity and target QoS for at least one target physical function to a physical function mapped to the at least one virtual machine.

According to another aspect of the present inventive concept, there is provided a a method of operating an electronic system. The method includes identifying a storage device and acquiring information about an amount of resources of the storage device, enumerating activated physical functions provided by the storage device, mapping each of the activated physical functions to one or more virtual machines, and providing, by a manager running on a hypervisor running the one or more virtual machines, a resource allocation request for setting a storage capacity and target QoS for a target physical function to an arbitrary physical function among the activated physical functions.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, preferred example embodiments of the present inventive concept will be described with reference to the accompanying drawings.

Figure 1:
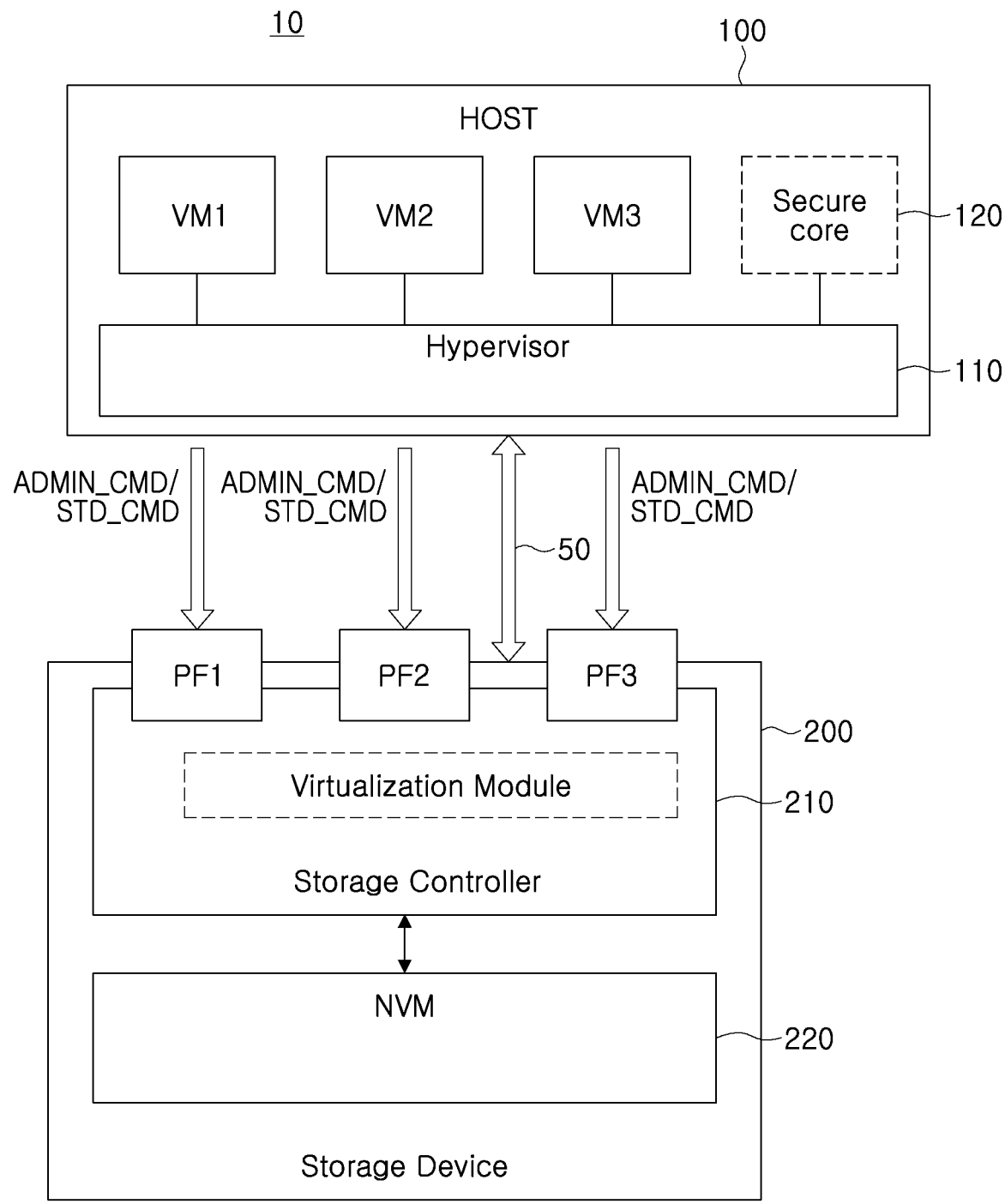
FIG. 1 is a diagram illustrating an electronic system according to an example embodiment of the present inventive concept.

FIG. 1 is a diagram illustrating an electronic system according to an example embodiment of the present inventive concept.

Referring to FIG. 1, an electronic system 10 may include a host 100, a storage device 200, and a bus 50 connecting the host 100 and the storage device 200 to each other.

The host 100 may be a computing device such as a desktop computer, a laptop computer, a network server, or a mobile device. The host 100 may include an application processor, a microprocessor, a central processing unit (CPU), a processor core, a multi-core processor, a multi-processor, an application-specific integrated circuit (ASIC), and a field programmable gate array (FPGA).

The storage device 200 may store data in response to a request of the host 100. For example, the storage device 200 may include at least one of a solid state drive (SSD), an embedded memory, and an attachable and detachable external memory.

The storage device 200 may include a storage controller 210 and a nonvolatile memory device 220. The nonvolatile memory device 220, a storage medium for storing data received from the host 100, may include, for example, a flash memory. The storage controller 210 may control the nonvolatile memory device 220.

When the storage device 200 is an SSD, the storage device 200 may be a device conforming to a nonvolatile memory express (NVMe) standard. When the storage device 200 is a device conforming to the NVMe standard, the bus 50 may be a peripheral component interconnect express (PCIe) bus.

The NVMe standard may be a standard defined between the host 100 and the storage controller 210. The NVMe standard may define a register interface, a command set, and a collection of functions for a PCIe-based storage device 200. The storage controller 210, conforming to the NVMe standard, may communicate with the host 100 based on a PCIe, and may support a plurality of parallel command queues, thereby providing improved performance. The NVMe standard may not limit a type of storage device 200.

The host 100 may execute at least one operating system using a processor. The operating system may manage and control overall functions and operations of the host 100. For example, the host 100 may execute the hypervisor 110 under a host operating system. The hypervisor 110 may be a component of the host operating system, or may be provided by an application executed under the host operating system.

The hypervisor 110 may abstract physical resources including a processor, memory, and input/output device, and may provide the abstracted physical resources to virtual machines VM1, VM2, and VM3 as a virtual device including a virtual processor, a virtual memory, and a virtual input/output device. Each of the virtual machines VM1, VM2, and VM3 may execute a guest operating system using the virtual device. One or more applications may be executed under the guest operating system.

The hypervisor 110 may further execute a secure core 120. The secure core 120, a type of virtual machine, may run in a memory region different from other virtual machines VM1, VM2, and VM3, thereby providing enhanced security.

The storage controller 210 may provide a plurality of virtual storage devices to the host 100 by executing a virtualization module. For example, the storage controller 210 may provide a plurality of physical functions PF1, PF2, and PF3. A physical function may refer to a full-featured PCIe function that may be discovered, managed, and manipulated in the same manner as any other PCIe device. The physical functions PF1, PF2, and PF3 may appear as different physical storage devices on the host 100. The host 100 may independently and individually access the physical functions PF1, PF2, and PF3.

The physical functions PF1, PF2, and PF3 may be distinguished from a virtual function, a lightweight PCIe function sharing one or more resources with a physical function. The physical functions PF1, PF2, and PF3 may be appear as an actual PCIe device accessible by the host 100, even when the host 100 does not support a single root input/output virtualization (SR-IOV) standard. That is, the storage device 200 may provide the physical functions PF1, PF2, and PF3, thereby implementing virtualization without depending on software conversion performed by the hypervisor 110.

The storage device 200 may allocate resources such as a storage space or the like to each of the physical functions PF1, PF2, and PF3, and may be required to ensure consistent target quality of service (QOS) with respect to the physical functions PF1, PF2, and PF3.

QoS may refer to capability of the storage controller 210 to prioritize data flows between different physical functions PF1, PF2, and PF3 to ensure stable and consistent performance for a data input/output operation of each of the different physical functions PF1, PF2, PF3. For example, performance indicators of QoS may include input/output operations per second (IOPS), response time, throughput, and the like.

In order to ensure stable QoS for each of the different physical functions PF1, PF2, and PF3, even when a workload is concentrated on a first physical function PF1, the storage device 200 may process the workload within a limit of target QoS of the first physical function PF1. In addition, processing of the workload concentrated on the first physical function PF1 by the storage device 200 may not affect QoS of the second and third physical functions PF2 and PF3.

A plurality of virtual machines VM1, VM2, and VM3 may be provided for a plurality of users of the electronic system 10. The virtual machines VM1, VM2, and VM3 may be mapped to physical functions PF1, PF2, and PF3. Users may access a physical function mapped to a virtual machine, using the virtual machine provided to themselves. An example of the electronic system 10 may be a server system providing cloud storage to multiple users, a web server system providing a web service to multiple users, or the like.

The electronic system 10 may operate various policies and provide the users with the physical functions PF1, PF2, and PF3 having a storage capacity and QoS determined according to a policy. For example, the electronic system 10 may provide physical functions PF1, PF2, and PF3 each having a storage capacity and QoS differentiated according to usage fees collected from the users. Accordingly, a storage capacity and QoS required for each of the physical functions PF1, PF2, and PF3 may be individually determined.

In order for the electronic system 10 to ensure a fixed storage capacity and stable QoS for each of the physical functions PF1, PF2, and PF3, it may become important to allocate resources of the storage device 200 to the physical functions PF1, PF2, and PF3.

As a related technology for allocating resources to physical functions, there may be a technology in which a storage device includes a parent physical function, and the parent physical function generates a plurality of child physical functions in response to a request of a host, and allocates resources to the plurality of child physical functions. According to the related technology, the plurality of child physical functions may be allocated to virtual machines, and the parent physical function may be used to allocate resources to the child physical functions without being allocated to virtual machines.

Execution of the parent physical function merely used to allocate the resources to the child physical functions may cause overhead on the storage device 200. For example, each of the physical functions may occupy resources such as a memory space for the storage controller 210 to provide a register interface. When the parent physical function being not allocated to a virtual machine occupies resources of the storage device 200, unnecessary overhead may be caused on the storage device 200, and the number of physical functions providable for the virtual machine may be limited.

According to an example embodiment of the present inventive concept, the storage device 200 may provide the physical functions PF1, PF2, and PF3 equivalent to each other. The physical functions PF1, PF2, and PF3 equivalent to each other may mean that physical functions do not have a parent-child relationship with respect to each other. Each of the equivalent physical functions PF1, PF2, and PF3 may process both a management command ADMIN_CMD and a standard command STD_CMD specified in the NVMe standard.

The storage device 200 may allocate a predetermined amount of resources to each of the physical functions PF1, PF2, and PF3 under the control of the host 100. In addition, the physical functions PF1, PF2, and PF3 may be mapped to the virtual machines VM1, VM2, and VM3, respectively.

According to an example embodiment of the present inventive concept, the secure core 120 of the host 100 may map the physical functions PF1, PF2, and PF3 to the virtual machines VM1, VM2, and VM3, and may control an amount of resources to be allocated to the physical functions PF1, PF2 and PF3. The secure core 120 may reduce overhead of the storage device 200 for resource allocation by controlling the amount of resources to be allocated to the physical functions PF1, PF2, and PF3. In addition, the amount of resources to be allocated may be controlled using the secure core 120 having enhanced security, thereby preventing a malicious user from diverting resources of the storage device 200.

The present inventive concept is not limited to the secure core 120 controlling the amount of resources to be allocated to the physical functions PF1, PF2, and PF3. For example, as a virtual machine running on the hypervisor 110, a virtual machine referred to by other names such as a management core or a management virtual machine may control the amount of resources. In some example embodiments, the hypervisor 110 may directly control the amount of resources to be allocated to the physical functions PF1, PF2, and PF3. Hereinafter, an element running under the host operating system, including the secure core 120, other virtual machines, and the hypervisor 110, the element capable of controlling the amount of resources to be allocated to the physical functions PF1, PF2, and PF3 may also be referred to as a manager. In some example embodiments, the hypervisor 110 and the secure core 120 may be referred to as a virtual machine manager VMM. Herein, for convenience of description, the terms of the VMM and the manager may be used interchangeably.

According to an example embodiment of the present inventive concept, the host 100 may control the amount of resources allocated to the physical functions PF1, PF2, and PF3, the storage device 200 may no longer require a parent physical function used only to generate and manage other physical functions. For example, all of the physical functions PF1, PF2, and PF3 of the storage device 200 may be allocated to the virtual machines VM1, VM2, and VM3, and an additional physical function that may not be allocated to the virtual machines VM1, VM2, and VM3 may be unnecessary. Accordingly, the storage device 200 may provide a limited number of physical functions to more users.

Hereinafter, a method in which the host 100 allocates resources of the storage device 200 to the physical functions PF1, PF2, and PF3 according to an example embodiment of the present inventive concept will be described with reference to FIGS. 2, 3, 4A, 4B, 5, and 6.

Figure 2:
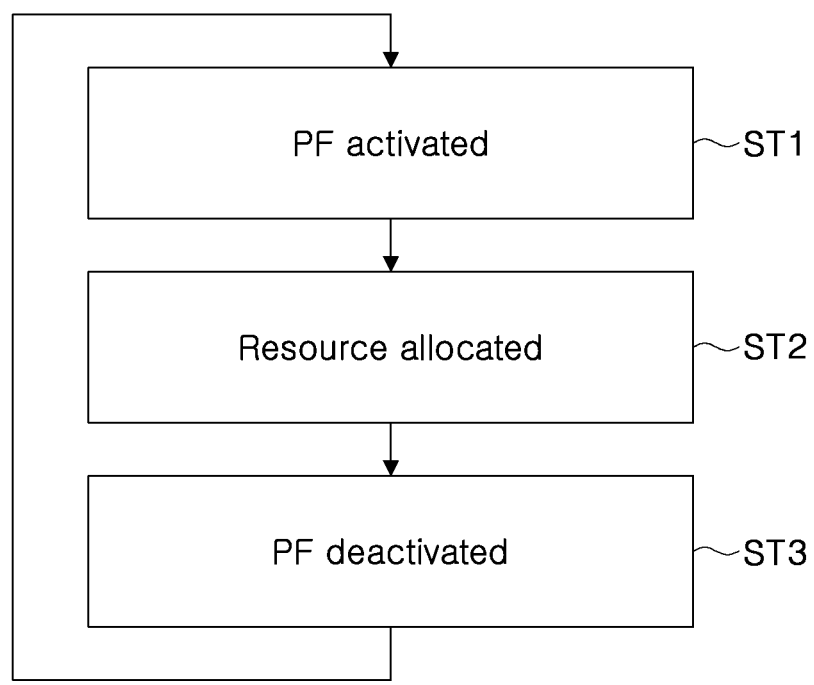
FIG. 2 is a state machine representing states that a physical function supported by a storage device may have according to example embodiments.

FIG. 2 is a state machine representing states that a physical function supported by a storage device may have according to example embodiments.

A storage device 200 may support a predetermined number of physical functions. Each of the physical functions supported by the storage device 200 may be activated or deactivated. An activated physical function may refer to a physical function that appear as a physical storage device on a host 100. In addition, a deactivated physical function may refer to a physical function that do not appear on the host 100, among a maximum number of physical functions that may be supported by the storage device 200.

A first state ST1 may exemplify a state in which a physical function PF is activated. A deactivated physical function may be activated in response to a command from the host 100, and may appear as a physical storage device on the host 100. In the example of FIG. 1, the physical functions PF1, PF2, and PF3 may be activated physical functions, that appear on the host 100. The first state ST1 may represent a state in which resources such as storage capacity and QoS are not allocated to the activated physical function PF.

A second state ST2 may exemplify a state in which resources are allocated to the activated physical function PF. As briefly described with reference to FIG. 1, resources may be allocated to the physical function PF in response to a control of a manager. When resources are allocated to the physical function PF that is in the first state ST1, the physical function PF may be in the second state ST2. Resources may also be reallocated to the physical function PF that is in the second state ST2 in response to a control of the manager. A method of allocating resources of the storage device 200 to the physical function PF in response to a control of the manager will be described below with reference to FIGS. 3, 4A, 4B, 5, and 6.

A third state ST3 may exemplify a state in which the physical function PF is deactivated. A physical function that is in the second state ST2 may be deactivated in response to a command from the host 100, and may no longer appear in the host 100. In the example of FIG. 1, the storage device 200 may further have a plurality of deactivated physical functions not appearing in the host 100, in addition to the physical functions PF1, PF2, and PF3. When the physical function PF is deactivated, resource allocation of the physical function PF may be released.

Figure 3:
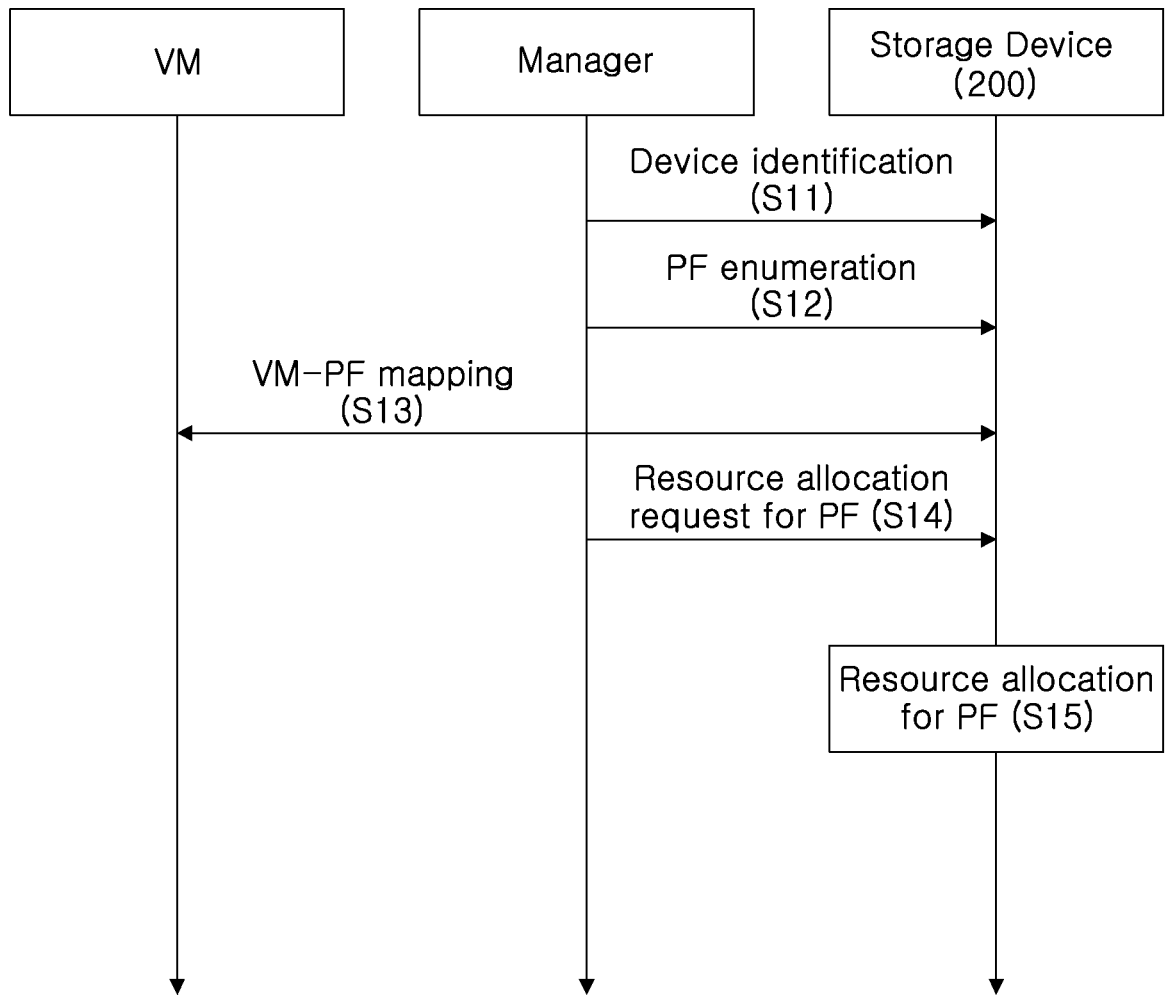
FIGS. 3, 4A, and 4B are diagrams illustrating a method of allocating resources of a storage device according to an example embodiment of the present inventive concept.
Figure 4A:
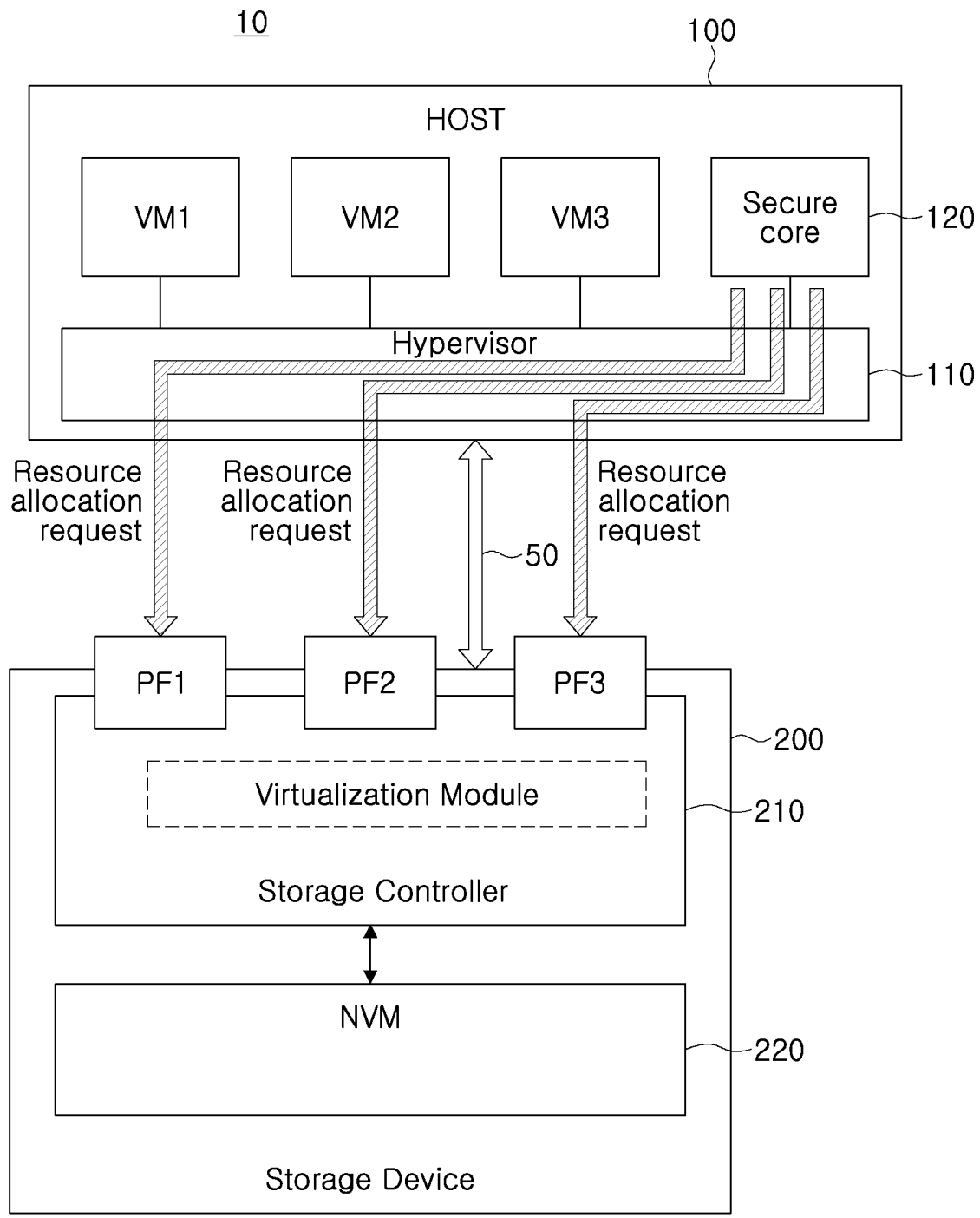
Figure 4B:
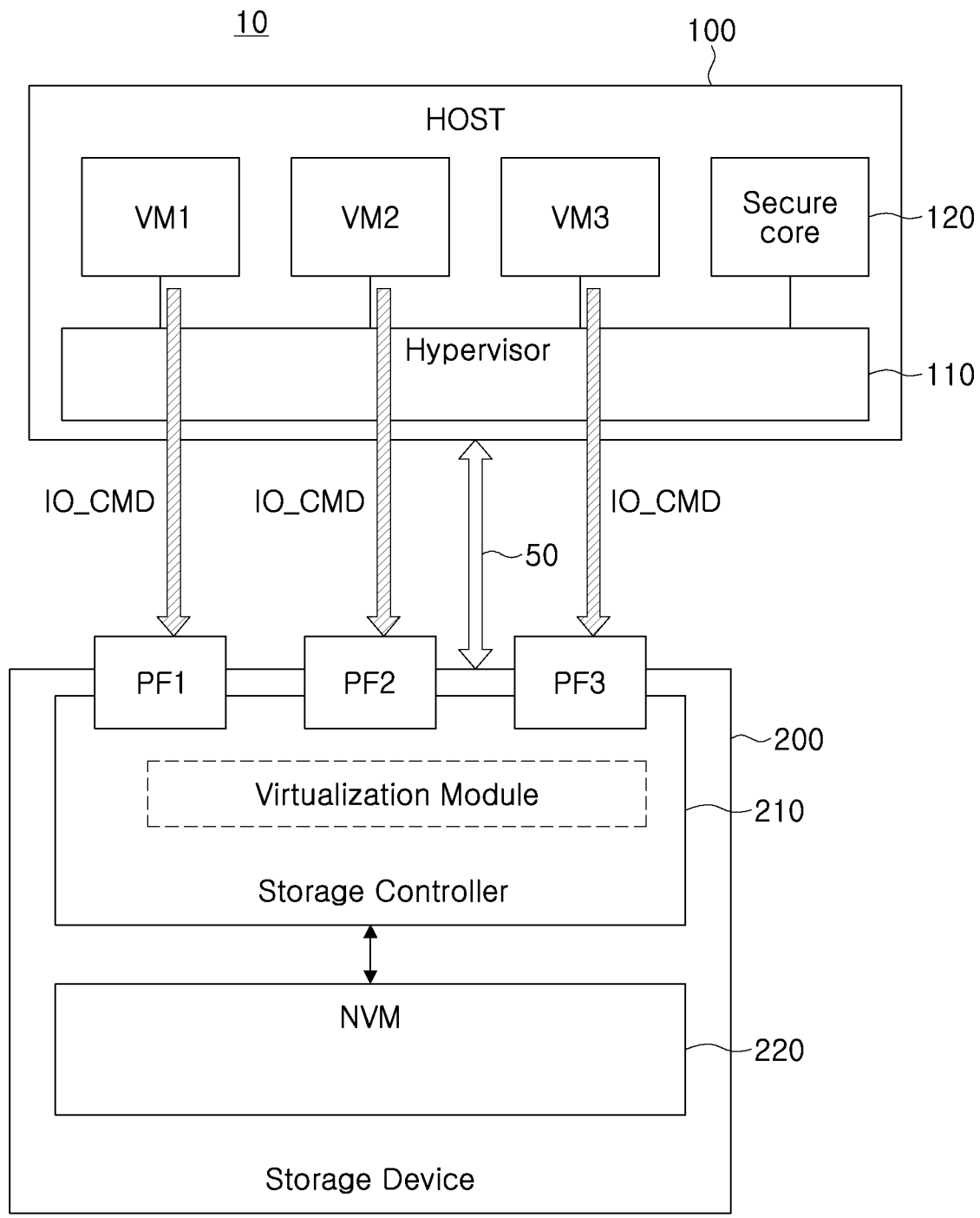

FIGS. 3, 4A, and 4B are diagrams illustrating a method of allocating resources of a storage device according to a first example embodiment of the present inventive concept. Specifically, FIG. 3 illustrates a transaction between a virtual machine VM, a manager, and a storage device 200, and FIGS. 4A and 4B illustrate a signal transmission path in an electronic system 10 described with reference to FIG. 1.

Referring to FIG. 3, in operation S11, a manager may identify the storage device 200 by enumerating input/output devices connected to a host 100. For example, the storage device 200 may return (or response) a device path of the storage device 200 in response to enumeration by the manager. Operation S11 may be triggered when the storage device 200 is initialized.

The manager may further acquire information about an amount of resources of the identified storage device 200. For example, the information about the amount of resources may include a storage capacity of the storage device 200, the maximum number of physical functions that may be provided by the storage device 200, the maximum number of command queues, the maximum number of namespaces, a bandwidth of the storage device 200, maximum QoS, and the like.

In operation S12, the manager may enumerate physical functions provided by the storage device 200. For example, the storage device 200 may return identifiers of the activated physical functions, in response to enumeration by the manager. In the example of FIG. 1, the identifiers of activated physical functions PF1, PF2, and PF3 may be returned to the manager.

In operation S13, the manager may map a virtual machine VM and a physical function PF. The physical function PF that may be mapped to the virtual machine VM may be an activated physical function having the first state ST1 or the second state ST2 described with reference to FIG. 2.

For example, a first virtual machine VM1 may be mapped to a first physical function PF1, a second virtual machine VM2 may be mapped to a second physical function PF2, and a third virtual machine VM3 may be mapped to a third physical function PF3. However, mapping between the virtual machine VM and the physical function PF is not limited thereto, a plurality of virtual machines may share one physical function, and one virtual machine may be mapped to a plurality of physical functions. In addition, a mapping relationship between the virtual machines and the physical functions may vary. For example, the plurality of virtual machines may be mapped to the one physical function when a plurality of users access the same web site, and mapping between the virtual machines and the physical functions may be released when the access is terminated.

In operation S14, the manager may provide a resource allocation request to the physical function PF in order to control the amount of resources to be allocated to the physical function PF. For example, the resource allocation request may be provided in the format of a set feature command. The set feature command may refer to a command used to change a configuration of the storage device 200, and the set feature command may be a type of management command ADMIN_CMD. However, the present inventive concept is not limited to a case in which the resource allocation request is provided in the format of the set feature command. For example, the resource allocation request may be provided via commands having various formats defined in a standard such as NVMe or the like, and may be provided via a sideband signal transmitted via a dedicated wire or pin allocated separately from a command wire or pin.

FIG. 4A illustrates a case in which a secure core 120 as a manager provides a resource allocation request to each of the physical functions PF1, PF2, and PF3 in order to control an amount of resources to be allocated to each of the physical functions PF1, PF2, and PF3. Specifically, the secure core 120 may provide a packet including the resource allocation request to the storage device 200 via a bus 50, and the packet may include information for identifying which physical function for which the resource allocation request is a command. The packet may be a transaction layer packet (TLP) defined in a PCIe standard.

As described with reference to FIG. 1, the secure core 120, a type of virtual machine, may access each of the physical functions PF1, PF2, and PF3. For example, the secure core 120, in addition to the virtual machines VM1, VM2, and VM3, may be further mapped to the physical functions PF1, PF2, and PF3.

The secure core 120 may determine the amount of resources to be allocated to the physical functions PF1, PF2, and PF3 based on a policy applied to the physical functions PF1, PF2, and PF3, and a total amount of resources of the storage device 200. As described with reference to FIG. 1, the secure core 120 may run in a memory isolated from the virtual machines VM1, VM2, and VM3. Accordingly, a malicious user, using a virtual machine, may be prevented from accessing a memory region of the secure core 120 to determine the amount of resources, thereby unfairly diverting resources from the storage device 200.

Referring back to FIG. 3, in operation S15, the storage device 200 may allocate resources to the physical function PF, in response to the resource allocation request. For example, the storage device 200 may allocate, to the physical function PF, a logical storage space of the storage device 200 corresponding to a storage capacity requested by the resource allocation request. In addition, the storage device 200 may allocate, to the physical function PF, a buffer region having a size sufficient to achieve QoS requested by the resource allocation request, and a sufficient number of command queues.

Referring to FIG. 4B, the physical function PF to which resources are allocated may allow the virtual machine VM to access data by processing a data input/output command IO CMD received from the virtual machine VM. For example, the physical functions PF1, PF2, and PF3 may process data input/output commands received from the mapped virtual machines VM1, VM2, and VM3, respectively. The data input/output command IO CMD may be included in the standard command STD_CMD of FIG. 1.

According to an example embodiment of the present inventive concept, the physical functions PF1, PF2, and PF3 provided by the storage device 200, physical functions equivalent to each other, may allow a resource allocation request and a data input/output command to be received. For example, the host 100 may control resource allocation for the physical functions PF1, PF2, and PF3, using the physical functions PF1, PF2, and PF3 accessible by the virtual machines VM1, VM2, and VM3.

A resource allocation request received via an arbitrary physical function may not necessarily be a resource allocation request for a corresponding physical function, and may be a resource allocation request for another physical function. For example, the first physical function PF1 may receive a resource allocation request including a resource allocation request for all of the physical functions PF1, PF2, and PF3, and the storage device 200 may allocate resources to the physical functions PF1, PF2, and PF3 in response to the resource allocation request received from the first physical function PF1. Physical functions, resource allocation request targets, may be referred to as target physical functions.

It should be noted that, even when, based on a resource allocation request received via a physical function, resources of another physical function are allocated, the physical functions do not have a parent-child relationship therebetween. An arbitrary physical function, among the physical functions PF1, PF2, and PF3, may receive a resource allocation request including a resource allocation request for at least one target physical function. In addition, each of the physical functions PF1, PF2, and PF3 may receive a data input/output command from a virtual machine.

In order for the storage device 200 to provide, to the host 100, the physical functions PF1, PF2, and PF3 that may appear as individual physical storage devices, resources for each of the physical functions PF1, PF2, and PF3 may need to be allocated. For example, a register interface, a command queue, and the like for each of the physical functions PF1, PF2, and PF3 may be allocated to the storage device 200. According to an example embodiment of the present inventive concept, an additional physical function for controlling resource allocation for the physical functions PF1, PF2, and PF3 may be unnecessary, thereby saving resources such as a register interface and a command queue for the additional physical function.

The resource allocation method has been described with reference to FIGS. 3, 4A and 4B using, as an example, a case in which the manager directly controls resource allocation of the physical function PF, but the present inventive concept is not limited thereto. For example, the manager may provide a resource allocation authority of the physical function PF to the virtual machine VM, and the virtual machine VM may control resource allocation of the physical function PF.

Figure 5:
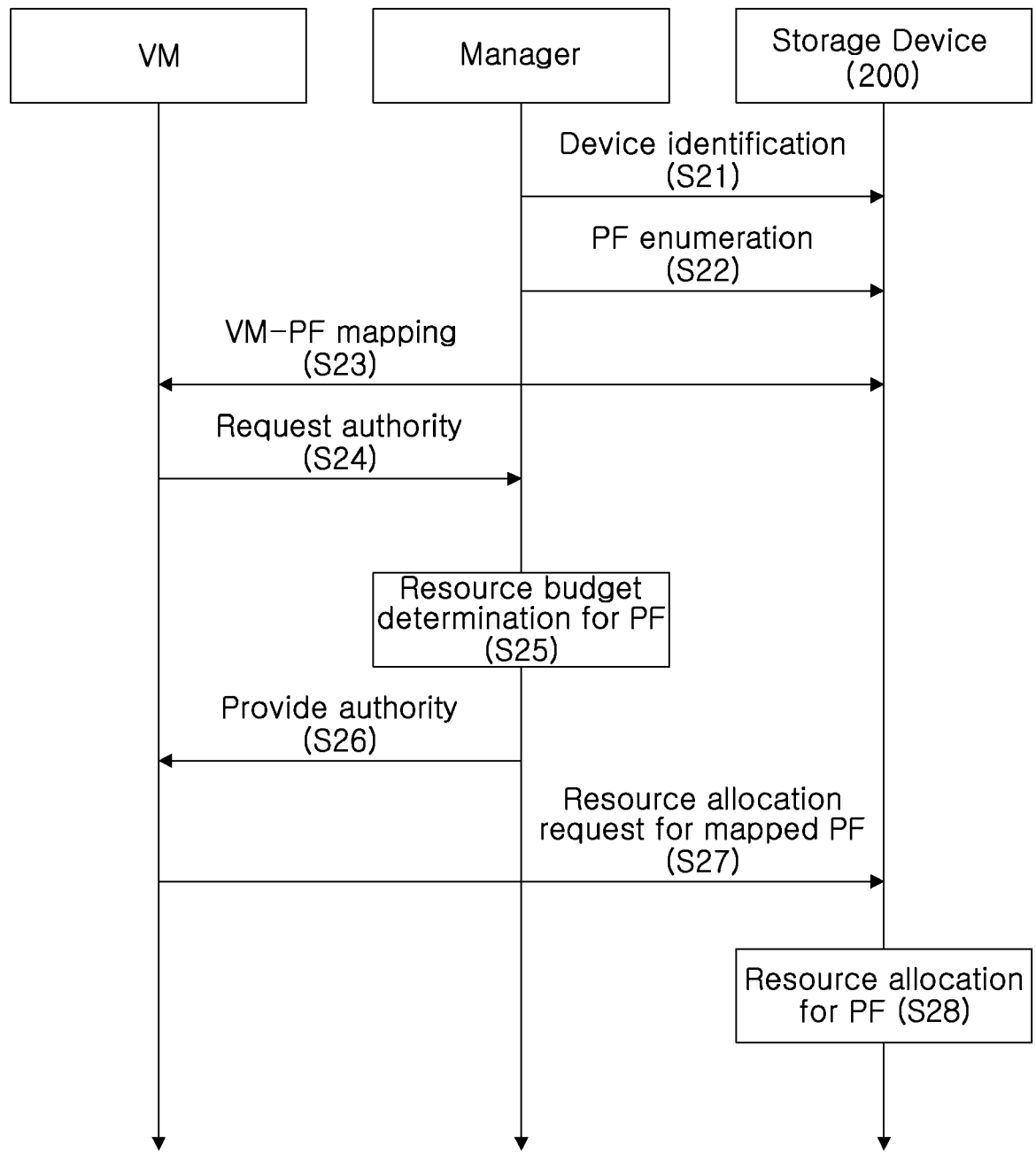
FIGS. 5 and 6 are diagrams illustrating a method of allocating resources of a storage device according to an example embodiment of the present inventive concept.
Figure 6:
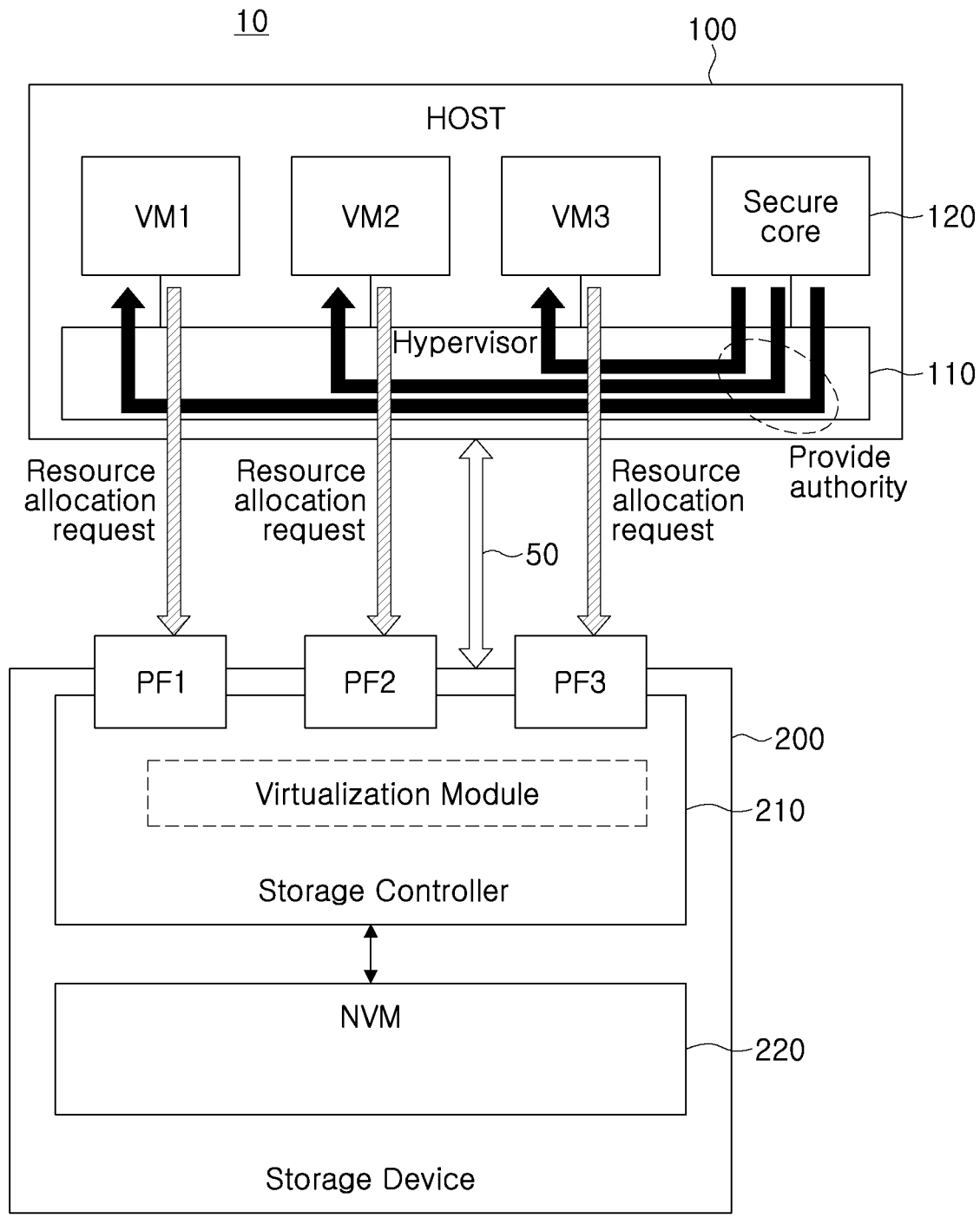

FIGS. 5 and 6 are diagrams illustrating a method of allocating resources of a storage device according to a second example embodiment of the present inventive concept. Specifically, FIG. 5 illustrates a transaction between a virtual machine VM, a manager, and a storage device 200, and FIG. 6 illustrates a signal transmission path in the electronic system 10 described with reference to FIG. 1.

Referring to FIG. 5, in operation S21, the manager may identify the storage device 200 by enumerating input/output devices connected to a host 100, and may acquire information about an amount of resources of the storage device 200. In operation S22, the manager may enumerate physical functions provided by the identified storage device 200. In operation S23, the manager may map the virtual machine VM to the enumerated physical functions PF. Operations S21 to S23 of FIG. 5 may be the same as operations S11 to S13 described with reference to FIG. 3.

In operation S24, the virtual machine VM may request, to a secure core 120, a resource allocation authority for a physical function PF mapped thereto.

In operation S25, the secure core 120 may determine a resource budget to be allocated to the physical function PF. For example, the manager may determine, as the resource budget, a storage capacity that may be allocated to the physical function PF mapped to the virtual machine VM and maximum QoS that may be provided to the physical function PF, based on a policy applied to a user using the virtual machine VM.

In operation S26, the manager may provide, to the virtual machine VM, a resource allocation authority within a range of the resource budget as a response to the request for the resource allocation authority.

In operation S27, the virtual machine VM may determine a size of a resource to be allocated to the physical function PF within the range of the resource budget. In addition, the virtual machine VM may control a storage capacity and target QoS of the physical function PF by providing the resource allocation request to the physical function PF in operation S28.

In operation S28, the storage device 200 may allocate resources to the physical function PF in response to the resource allocation request.

FIG. 6 illustrates a case in which the first physical function PF1 is allocated to the first virtual machine VM1, the second physical function PF2 is allocated to the second virtual machine VM2, and the third physical function PF3 is allocated to the third virtual machine VM3. The security core 120 as a manager may provide, to the virtual machines VM1, VM2, and VM3, a resource allocation authority within a resource budget range determined for each of physical functions PF1, PF2, and PF3 such that the virtual machines VM1, VM2, and VM3 allocates resources to the physical functions PF1, PF2, and PF3.

The virtual machines VM1, VM2, and VM3 may provide, to the physical functions PF1, PF2, and PF3, a resource allocation request for allocating resources to the physical functions PF1, PF2, and PF3 within the resource budget range. The storage device 200 may allocate, in response to the resource allocation request, resources to the physical functions PF1, PF2, and PF3.

According to an example embodiment of the present inventive concept, one physical storage controller 210 may integrally manage resources of the storage device 200 and allocate the resources of the storage device 200 to a plurality of physical functions PF1, PF2, and PF3. The one physical storage controller 210 may flexibly adjust an amount of resource allocation for the plurality of physical functions PF1, PF2, and PF3 by allocating the resources to each of the plurality of physical functions PF1, PF2, and PF3. As a result, the resources may be efficiently used. Hereinafter, a storage controller and a method of operating the storage controller according to an example embodiment of the present inventive concept will be described in detail with reference to FIGS. 7 to 9.

Figure 7:
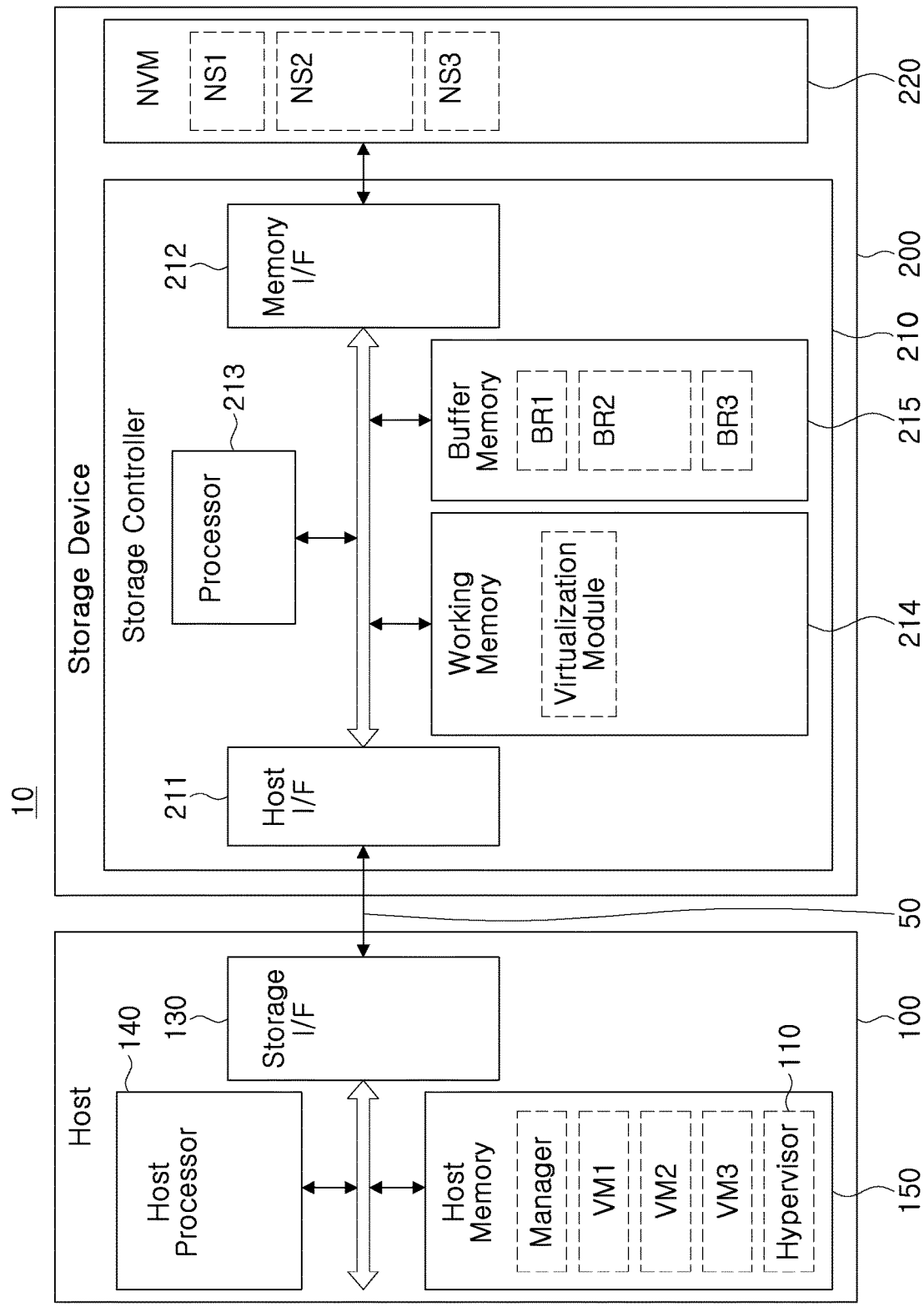
FIG. 7 is a diagram specifically illustrating an electronic system according to an example embodiment of the present inventive concept.

FIG. 7 is a diagram specifically illustrating an electronic system according to an example embodiment of the present inventive concept.

Referring to FIG. 7, an electronic system 10 may include a host 100, a storage device 200 and a bus 50. The host 100, the storage device 200, and the bus 50 of FIG. 7 may correspond to the host 100, the storage device 200 and the bus 50 described with reference to FIG. 1.

The host 100 may include a storage interface 130, a host processor 140 and a host memory 150.

The storage interface 130 may, based on a predetermined interface protocol, exchange a packet with the storage device 200. For example, the storage interface 130 may exchange, based on a PCIe interface protocol, the packet.

The host processor 140 may run a hypervisor 110, virtual machines VM1, VM2, and VM3, and a secure core 120 (a manager), as described with reference to FIG. 1.

The host memory 150 may store data required to run the host 100. Specifically, the host memory 150 may store data for running the hypervisor 110, the virtual machines VM1, VM2, and VM3, and the manager. In addition, the host memory 150 may further store a command queue pair for each of physical functions PF1, PF2, and PF3 provided by the storage device 200, and may temporarily store data to be stored on the physical functions PF1, PF2, and PF3 or data output from the physical functions PF1, PF2, and PF3.

The storage device 200 may include a storage controller 210 and a nonvolatile memory device 220. The storage controller 210 may include a host interface 211, a memory interface 212, a processor 213, a working memory 214 and a buffer memory 215.

The host interface 211 may transmit and receive a packet to and from the host 110. A packet transmitted from the host 110 to the host interface 211 may include a command and data to be written in the nonvolatile memory device 220. A packet transmitted from the host interface 211 to the host 110 may include a response to a command or data read from the nonvolatile memory device 220.

The memory interface 212 may transmit, to the nonvolatile memory device 220, data to be written in the nonvolatile memory device 220 or may receive data read from the nonvolatile memory device 220. The memory interface 212 may be implemented to conform to a standard protocol such as Toggle or ONFI.

The processor 213 may further include a hardware accelerator designed to perform a predefined operation at high speed, an input/output (I/O) interface providing a communication channel with an external component of the processor 213, and the like. In some example embodiments, components of the processor 213 may be integrated into a single chip or single die, and the processor 213 may be referred to as a system-on-chip (SoC). In some example embodiments, the components of the processor 213 may be integrated into two or more chips included in one package, and the processor 213 may be referred to as a system-in-package (SiP). The processor 213 may also be referred to as a microcontroller unit (MCU).

The working memory 214 may temporarily store data used by the processor 213. For example, at least some of instructions, included in a firmware image stored in the nonvolatile memory device 220, may be copied to the working memory 214, and the processor 213 may execute the copied instructions. For example, a virtualization module may be loaded into the working memory 214, and the processor 213 may allocate resources to physical functions in response to a control of the host 100 by executing the virtualization module. In some example example embodiments, the working memory 214 may include a volatile memory providing relatively high operating speed, such as static random access memory (SRAM).

The buffer memory 215 may temporarily store data to be stored in the nonvolatile memory device 220 or data output from the nonvolatile memory device 220. For example, the buffer memory 215 may include buffer regions BR1, BR2, and BR3 for storing data with respect to each of the physical functions PF1, PF2, and PF3. In some example embodiments, the buffer memory 216 may include a volatile memory such as dynamic random access memory (DRAM).

The nonvolatile memory device 220 may retain stored data even when power is not supplied. The nonvolatile memory device 220 may store data provided from the host 100 via a program operation and output data stored in the nonvolatile memory device 220 via a read operation. The nonvolatile memory device 220 may include one or more nonvolatile memories NVM. Each of the nonvolatile memories NVM may include a plurality of memory blocks. The memory blocks may respectively include a plurality of pages including a plurality of memory cells. The memory cells may be programmed or read in units of pages, and may be erased in units of memory blocks.

When the nonvolatile memory device 220 includes a flash memory, the flash memory may include a 2D NAND memory or a 3D (or vertical) NAND (VNAND) memory. As another example, the storage device 200 may include other various types of nonvolatile memories. For example, magnetic RAM (MRAM), spin-transfer torque MRAM, conductive bridging RAM (CBRAM), ferroelectric RAM (FeRAM), phase RAM (PRAM), resistive memory (resistive RAM), and other various types of memories may be applied to the storage device 200.

The nonvolatile memory device 220 may provide namespaces NS1, NS2, and NS3. A namespace may refer to a logical storage space of the storage device 200 that may be generated within a physical capacity of the nonvolatile memory device 220. The namespaces NS1, NS2, and NS3 may be accessed by the host 100 via physical functions PF1, PF2, and PF3, as described with reference to FIG. 1.

According to an example embodiment of the present inventive concept, the processor 213 may allocate, to the physical functions PF1, PF2, and PF3, resources having a size determined in response to a resource allocation request from the host 100 for the physical functions PF1, PF2, and PF3. When resource allocation to the physical functions PF1, PF2, and PF3 is completed, the host 100 may recognize each of the physical functions PF1, PF2, and PF3 as a physical device having the allocated resources.

As a first example, the resource allocation request may represent a storage capacity to be allocated to a physical function. The processor 213 may allocate a namespace to the physical function, may set a size of the namespace according to the storage capacity represented by the resource allocation request, and may allocate, to the namespace, logical addresses corresponding to a physical storage space of the nonvolatile memory device 220.

As a second example, the resource allocation request may further represent target QoS of the physical function. The processor 213 may allocate, based on the target QoS represented by the resource allocation request, a buffer region of the buffer memory 215 to the physical function, and may allocate at least some command queues, among command queues supported by the storage device 200. In the example of FIG. 7, buffer regions BR1, BR2, and BR3 allocated respectively to the physical functions PF1, PF2, and PF3 are exemplified.

The storage controller 210 may process a data input/output command for each of the physical functions PF1, PF2, and PF3 using a buffer region and a command queue allocated to each of the physical functions PF1, PF2, and PF3, thereby ensuring stable QoS with respect to each of the physical functions PF1, PF2, and PF3.

For example, a first virtual machine VM1 may transmit a packet including a command to a first physical function PF1. The packet may include information representing which physical function the command is for, for example, an identifier of a physical function.

When the packet is received from the host 100, the storage controller 210 may fetch a command included in the packet to a first buffer region BF1 allocated to the first physical function PF1 with reference to the identifier of the physical function included in the packet. In addition, the storage controller 210 may perform a data input/output operation on a first namespace NS1 in response to the command fetched to the first buffer region BR1. The first buffer region BR1 may be used for the data input/output operation on the first namespace NS1.

Hereinafter, a method in which the storage controller 210 ensures stable QoS for the physical functions PF1, PF2, and PF3 will be described in detail with reference to FIGS. 8 and 9.

Figure 8:
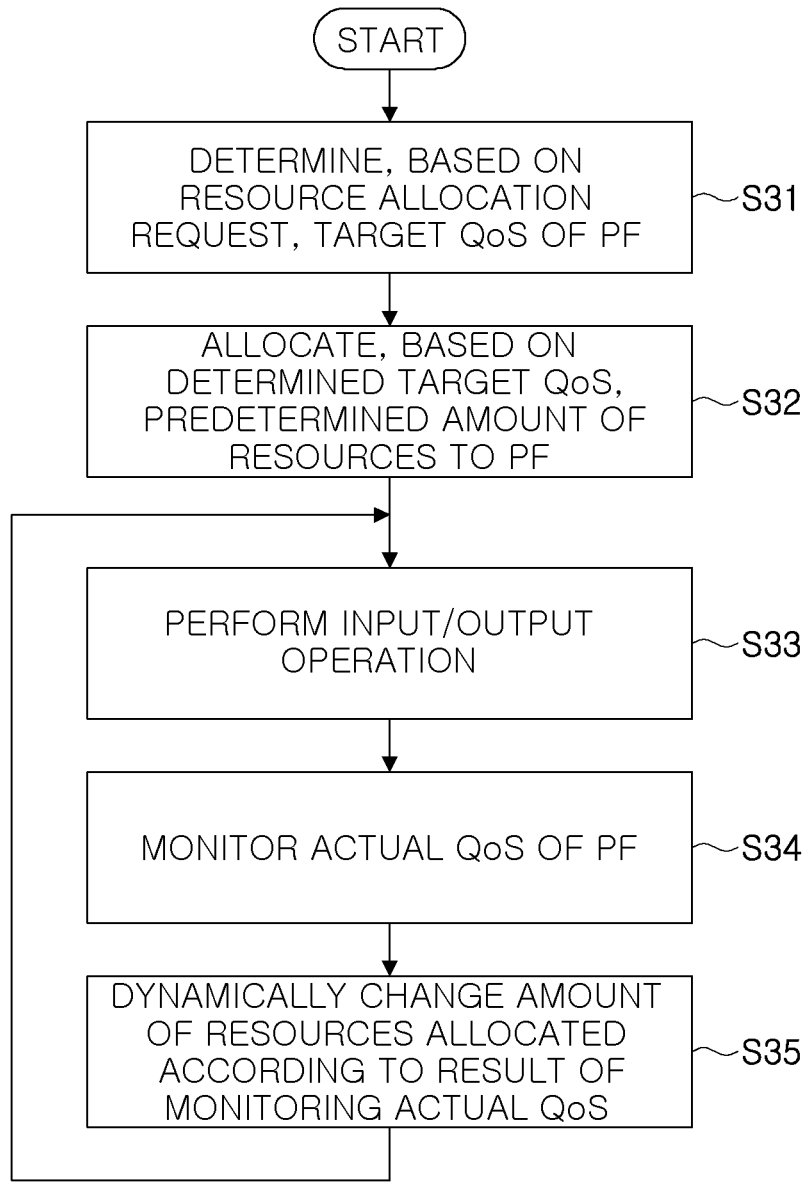
FIGS. 8 and 9 are diagrams illustrating an operation of a storage controller according to an example embodiment of the present inventive concept.

FIG. 8 is a flowchart illustrating an operation of a storage controller according to an example embodiment of the present inventive concept.

An operation performed by the storage controller 210 to ensure stable QoS with respect to a physical function PF may start from receiving, the storage controller 210, a resource allocation request including a resource allocation request for the physical function PF.

In operation S31, the storage controller 210 may determine, in response to the resource allocation request, target QoS of the physical function PF. As described with reference to FIGS. 3, 4A, 4B, 5, and 6, a resource allocation request including target QoS of the physical function PF may be provided from a manager of the host 100 or a virtual machine VM. A processor 213 of the storage controller 210 may determine target QoS to be allocated to the physical function PF by analyzing the resource allocation request.

In operation S32, the storage controller 210 may allocate, based on the target QoS, a predetermined amount of resources to the physical function PF.

In operation S33, the storage controller 210 may perform an input/output operation, in response to a data input/output command from the host 100 for the physical function PF. In order to perform an input/output operation for the physical function PF, the storage controller 210 may use resources allocated to the physical function PF.

When the plurality of physical functions PF1, PF2, and PF3 are activated, as described with reference to FIG. 1, the storage controller 210 may schedule the execution order of data input/output commands for the respective plurality of physical functions PF1, PF2, and PF3 in order to ensure target QoS of each of the plurality of physical functions PF1, PF2, and PF3. For example, the storage controller 210 may schedule the execution order to be preferentially executed a command for a physical function having higher target QoS, among commands for the plurality of physical functions PF1, PF2, and PF3 queued in a plurality of command queues included in the host memory 150.

In operation S34, the storage controller 210 may monitor whether actual QoS for the physical function PF is maintained at a level of the target QoS determined in operation S31. For example, the storage controller 210 may determine, based on input/output performance between the host 100 and the physical function PF, the actual QoS for the physical function PF.

In operation S35, the storage controller 210 may dynamically change the amount of resources allocated to the physical function PF according to a QoS monitoring result. For example, the storage controller 210 may dynamically adjust a size of a buffer region allocated to the physical function PF or the number of command queues according to the QoS monitoring result. Hereinafter, an example embodiment of the present inventive concept will be described in more detail using, as an example, a case in which the storage controller 210 allocates, based on the target QoS of the physical function PF, the buffer region to the physical function PF.

Figure 9:
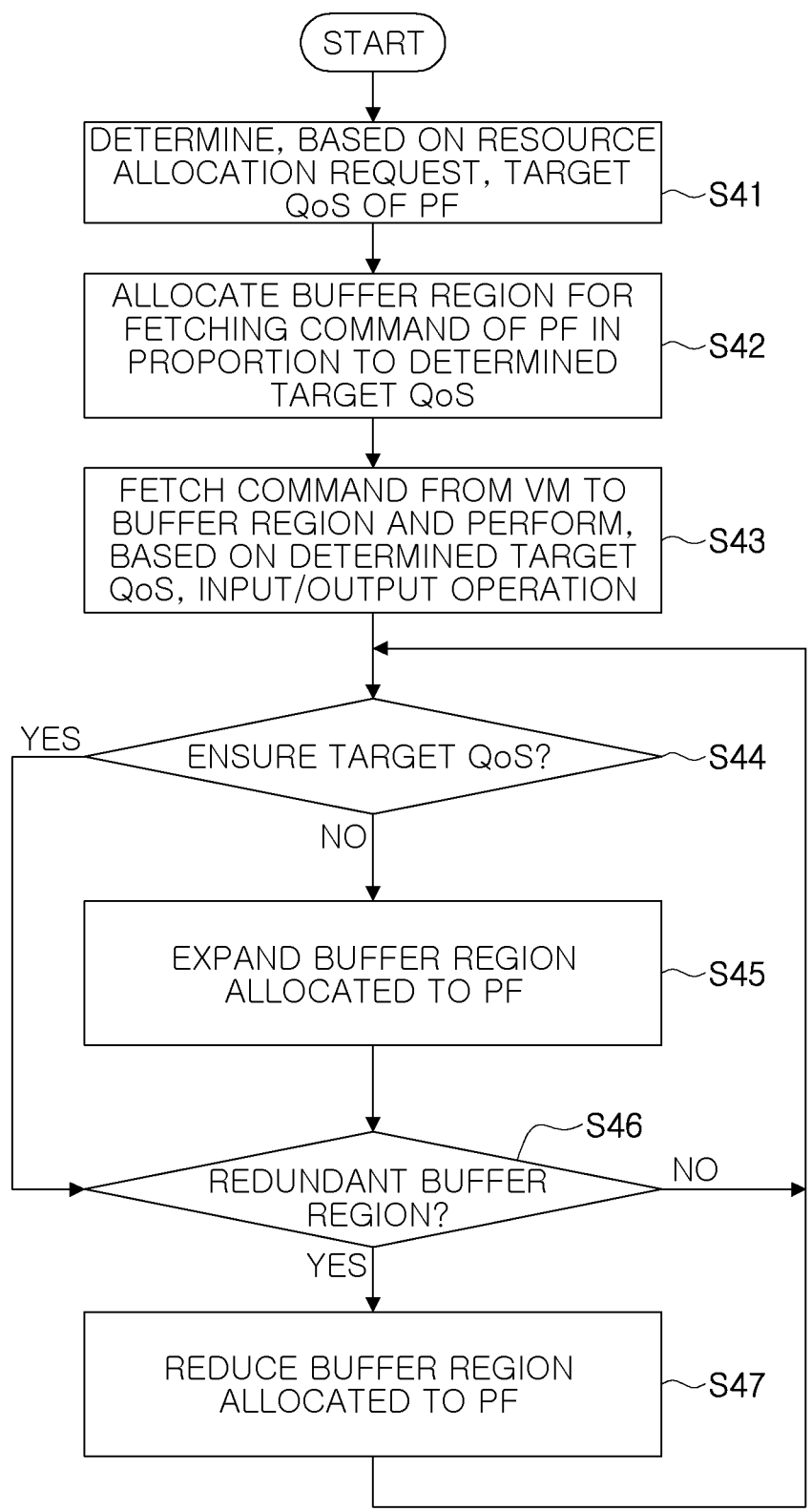

FIG. 9 is a flowchart illustrating a specific example of an operation of the storage controller of FIG. 8.

In operation S41, the storage controller 210 may determine, based on a resource allocation request, target QoS of a physical function PF. Operation S41 may be the same as operation S31 described with reference to FIG. 8.

In operation S42, the storage controller 210 may determine a size of a buffer region allocated to the physical function PF in proportion to the target QoS of the physical function PF, and may allocate the buffer region having the determined size to the physical function PF. For example, the storage controller 210 may allocate the buffer region, having an address range predetermined based on the determined size, to the physical function PF.

The allocating the buffer region to the physical function PF may include providing the buffer region to the physical function PF such that the physical function PF fetches a command from a virtual machine VM and buffers input/output data corresponding to the command. As the size of the buffer region allocated to the physical function PF increases, the number of commands that may be fetched or an amount of input/output data that may be buffered may increase. Accordingly, as the size of the buffer region increases, QoS that may be provided to the physical function PF may generally increase.

In operation S43, the storage controller 210 may fetch, to the buffer region, a command from the virtual machine VM for the physical function PF, and may perform, based on the target QoS, a data input/output operation. For example, the command may be fetched according to an order scheduled based on the target QoS.

In operation S44, the storage controller 210 may monitor actual QoS of the physical function PF, and may determine whether the target QoS is ensured. For example, the actual QoS of the physical function PF may be monitored based on performance indicators such as IOPS, response time, and throughput associated with the physical function PF. In addition, when a value of the actual QoS of the physical function PF is greater than or equal to a value of the target QoS, it may be determined that the target QoS is ensured.

When the value of the actual QoS of the physical function PF is less than the value of the target QoS ("No" in operation S44), the storage controller 210 may expand the size of the buffer region allocated to the physical function PF in operation S45.

For example, when the physical function PF has a workload pattern concentrated on a random read or random write, a larger number of commands may need to be processed at the same time in order for the physical function PF to ensure QoS. The size of the buffer region allocated in proportion to the QoS may not be sufficient to fetch a large number of commands. As a result, it may be difficult to ensure the target QoS. The storage controller 210 may ensure the target QoS of the physical function PF by expanding the size of the buffer region.

When the value of the actual QoS of the physical function PF is equal to or greater than the value of the target QoS ("Yes" in operation S44), the storage controller 210 may perform operation S46.

In operation S46, the storage controller 210 may determine whether there is a redundant buffer region in the buffer region allocated to the physical function PF. For example, the storage controller 210 may monitor an amount of usage of the buffer region, and may determine whether a buffer region, having a large size compared to the monitored amount of usage, is allocated to the physical function PF.

When there is a redundant buffer region ("Yes" in operation S47), the storage controller 210 may reduce the buffer region allocated to the physical function PF in operation S47. For example, the storage controller 210 may recover a portion of the allocated buffer region.

The storage controller 210 may efficiently use the minimum buffer region within a limit capable of guaranteeing the target QoS of the physical function PF. Also, the storage controller 210 may use the buffer region recovered from the physical function PF to ensure QoS of other physical functions. For example, the storage controller 210 may efficiently manage resources of the buffer memory 150 to ensure QoS of the plurality of activated physical functions PF1, PF2, and PF3.

When there is no redundant buffer region ("No" in operation S47), the storage controller 210 may perform operation S44. For example, the storage controller 210 may dynamically adjust the size of the buffer region while continuously performing input/output operations and monitoring operations for the physical function PF.

According to an example embodiment of the present inventive concept, instead of allocating, by a plurality of virtual controllers corresponding to physical functions, resources allocated to each of the plurality of virtual controllers to the physical functions, one physical storage controller 210 may collectively manage resources of the storage device 200 and allocate the managed resources to a plurality of physical functions PF1, PF2, and PF3. According to an example embodiment of the present inventive concept, the flexibility of resource allocation may be improved.

Figure 10:
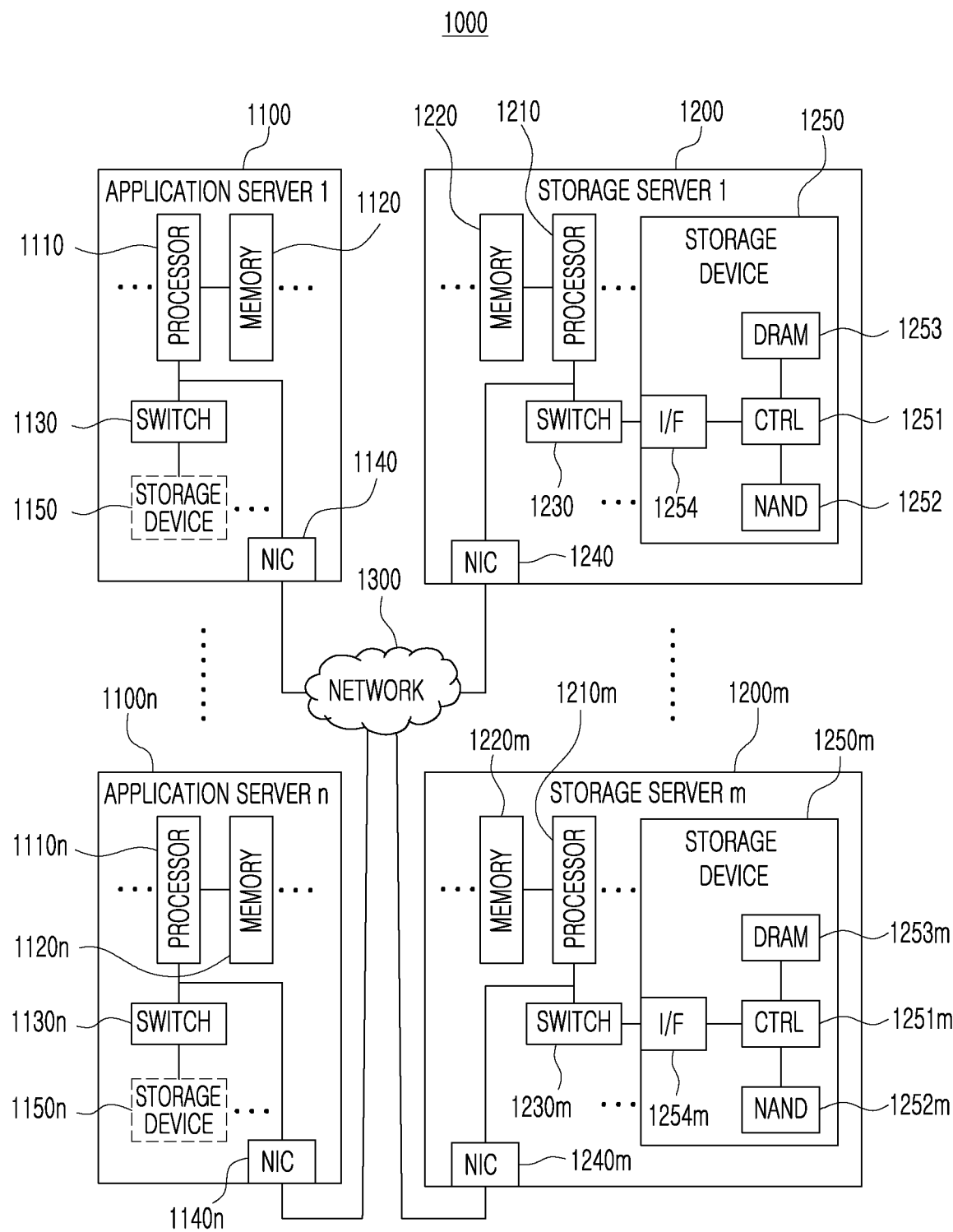
FIG. 10 is a diagram illustrating a server system to which an electronic system is applicable according to an example embodiment of the present inventive concept.

FIG. 10 is a diagram illustrating a server system to which an electronic system is applicable according to an example embodiment of the present inventive concept.

Referring to FIG. 10, a data center 1000, a facility storing various types of data and providing services, may also be referred to as a data storage center. The data center 1000 may be a system for operating a search engine and a database, and may be a computing system used by a company such as a bank or a government agency. The data center 1000 may include application servers 1100 to 1100$n$, $n$ being a natural number, and storage servers 1200 to 1200$m$, $m$ being a natural number. The number of application servers 1100 to 1100$n$ and the number of storage servers 1200 to 1200$m$ may be selected in various manners in some example embodiments, and the number of application servers 1100 to 1100$n$ and the number of storage servers 1200 to 1200$m$ may be different from each other.

The application server 1100 or the storage server 1200 may include at least one of processors 1110 and 1210 and memories 1120 and 1220. Describing the storage server 1200 as an example, the processor 1210 may control overall operations of the storage server 1200, and may access the memory 1220 to execute instructions and/or data loaded into the memory 1220. The memory 1220 may be a double data rate synchronous DRAM (DDR), a high bandwidth memory (HBM), a hybrid memory cube (HMC), a dual in-line memory module (DIMM), an optane DIMM, and/or a non-volatile memory DIMM (NVMDIMM). In some example embodiments, the number of processors 1210 and memories 1220, included in the storage server 1200, may be selected in various manners. In an example embodiment, the processor 1210 and the memory 1220 may provide a processor-memory pair. In an example embodiment, the number of processors 1210 and the number of memories 1220 may be different from each other. The processor 1210 may include a single core processor or a multi-core processor. The above description of the storage server 1200 may be applied to the application server 1100 in a similar manner. In some example embodiments, the application server 1100 may not include the storage device 1150. The storage server 1200 may include at least one storage device 1250. The number of storage devices 1250, included in the storage server 1200, may be selected in various manners in some example embodiments.

The application servers 1100 to 1100$n$ and the storage servers 1200 to 1200$m$ may communicate with each other via a network 1300. The network 1300 may be implemented using a fiber channel (FC) or Ethernet. In this case, the FC may be a medium used for relatively high-speed data transmission, and may use an optical switch, providing high performance/high availability. The storage servers 1200 to 1200$m$ may be provided as file storage, block storage, or object storage according to an access method of the network 1300.

In an example embodiment, the network 1300 may be a storage-only network, such as a storage area network (SAN). For example, the SAN may be an FC-SAN using an FC network and implemented according to a FC protocol (FCP). As another example, the SAN may be an IP-SAN using a TCP/IP network and implemented according to an iSCSI (SCSI over TCP/IP or Internet SCSI) protocol. In another example embodiment, the network 1300 may be a general network such as a TCP/IP network. For example, the network 1300 may be implemented according to a protocol such as FC over Ethernet (FCOE), network attached storage (NAS), NVMe over Fabrics (NVMe-oF), or the like.

Hereinafter, the application server 1100 and the storage server 1200 will be mainly described. The description of the application server 1100 may be applied to another application server 1100$n$, and the description of the storage server 1200 may also be applied to another storage server 1200$m$.

The application server 1100 may store data requested by a user or client to be stored in one of the storage servers 1200 to 1200$m$ via the network 1300. In addition, the application server 1100 may acquire data requested by the user or client to be read from one of the storage servers 1200 to 1200$m$ via the network 1300. For example, the application server 1100 may be implemented as a web server, a database management system (DBMS), or the like.

The application server 1100 may access a memory 1120$n$ or a storage device 1150$n$ included in the other application server 1100$n$ via the network 1300, or may access memories 1220 to 1220$m$ or storage devices 1250 to 1250$m$ included in the storage servers 1200 to 1200$m$ via the network 1300. Accordingly, the application server 1100 may perform various operations on data stored in the application servers 1100 to 1100$n$ and/or the storage servers 1200 to 1200$m$. For example, the application server 1100 may execute an instruction for moving or copying data between the application servers 1100 to 1100$n$ and/or the storage servers 1200 to 1200$m$. In this case, the data may be moved from the storage devices 1250 to 1250$m$ of the storage servers 1200 to 1200$m$ to the memories 1120 to 1120$n$ of the application servers 1100 to 1100$n$ via the memories 1220 to 1220$m$ of the storage servers 1200 to 1200$m$, or may be directly moved to the memories 1120 to 1120$n$ of the application servers 1100 to 1100$n$. Data moved via the network 1300 may be encrypted data for security or privacy.

Describing the storage server 1200 as an example, the interface 1254 may provide a physical connection between the processor 1210 and a controller 1251, and a physical connection between a network interface card or a network interface controller (NIC) 1240 and the controller 1251. For example, the interface 1254 may be implemented using a direct attached storage (DAS) method directly connecting the storage device 1250 with a dedicated cable. In addition, for example, the interface 1254 may be implemented using various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), and/or compact flash (CF) card interface.

The storage server 1200 may further include a switch 1230 and the NIC 1240. The switch 1230 may selectively connect the processor 1210 and the storage device 1250 to each other or selectively connect the NIC 1240 and the storage device 1250 to each other, under the control of the processor 1210.

In an example embodiment, the NIC 1240 may include a network interface card, network adapter, and the like. The NIC 1240 may be connected to the network 1300 through a wired interface, a wireless interface, a Bluetooth interface, an optical interface, or the like. The NIC 1240 may include an internal memory, a digital signal processor (DSP), a host bus interface, and the like, and may be connected to the processor 1210 and/or the switch 1230 through the host bus interface. The host bus interface may be implemented as one of the examples of interface 1254 described above. In an example embodiment, the NIC 1240 may be integrated with at least one of the processor 1210, the switch 1230, and the storage device 1250.

In the storage servers 1200 to 1200*m* or application servers 1100 to 1100*n*, the processor transmits a command to the storage device 1150 to 1150*n* or 1250 to 1250*m* or the memory 1120 to 1120*n* or 1220 to 1220*m* to program data or can lead. In this case, the data may be error-corrected data through an Error Correction Code (ECC) engine. The data is data subjected to data bus inversion (DBI) or data masking (DM) processing, and may include Cyclic Redundancy Code (CRC) information. The data may be encrypted data for security or privacy.

The storage devices 1150 to 1150*n* and 1250 to 1250*m* may transmit, in response to a read command received from a processor, a control signal and a command/address signal to NAND flash memory devices 1252 to 1252*m*. Accordingly, when data is read from the NAND flash memory devices 1252 to 1252*m*, a read enable (RE) signal may be input as a data output control signal and output data to a DQ bus. A data strobe (DQS) may be generated using the RE signal. The command/address signal may be latched in a page buffer according to a rising edge or a falling edge of a write enable (WE) signal.

The controller 1251 may control overall operations of the storage device 1250. In an example embodiment, the controller 1251 may include static random access memory (SRAM). The controller 1251 may write data into the NAND flash 1252 in response to a write command, or may read data from the NAND flash 1252 in response to a read command. For example, a write command and/or a read command may be received from a processor 1210 in a storage server 1200, a processor 1210*m* in another storage server 1200*m*, or a processor 1110 or 1110*n* in an application server 1100 or 1100*n* can be provided. The DRAM 1253 may temporarily store (buffer) data to be written into the NAND flash 1252 or data read from the NAND flash 1252. Also, the DRAM 1253 may store metadata. Here, the metadata is user data or data generated by the controller 1251 to manage the NAND flash 1252. The storage device 1250 may include a Secure Element (SE) for security or privacy.

In some embodiments, each storage device of the storage devices 1150 to 1150*n* and 1250 to 1250*m* included in the application servers 1100 to 1100*n* and the storage servers 1200 to 1200*m* may correspond to the storage device 200 of FIG. 1.

The electronic system 10 according to the present inventive concept described with reference to FIGS. 1 to 3, 4A, 4B, and 5 to 9 may be applied to the application server 1100 or the storage server 1200. Using the storage server 1200 as an example, the processor 1210 may run a plurality of virtual machines on a hypervisor. In addition, the storage device 1250 may provide a plurality of virtual storage devices for the plurality of virtual machines.

According to an example embodiment of the present inventive concept, the plurality of virtual storage devices may be equivalent virtual storage devices having a general authority to process a data input/output command and a special authority to process a resource allocation request.

A manager running on the hypervisor or virtual machines authorized by the manager may provide a resource allocation request for resource allocation to the plurality of virtual storage devices. The storage controller 1251 may allocate resources to the plurality of virtual storage devices by processing the resource allocation request received via the plurality of virtual storage devices. The storage device 1250 may not need to provide a virtual storage device having a special authority for resource allocation, such that overhead required for the storage device 1250 to allocate resources to the virtual storage devices may be reduced.

In a method of allocating resources of a storage device according to an example embodiment of the present inventive concept, a host may control resource allocation of each of virtual storage devices, thereby reducing resource consumption required by a storage controller for resource allocation.

A storage controller according to an example embodiment of the present inventive concept may allow mapping of a virtual machine to each of virtual storage devices provided by the storage controller, such that a plurality of virtual storage devices may be efficiently used.

The storage controller according to an example embodiment of the present inventive concept may flexibly allocate, in response to a request of a host, resources to each of the plurality of virtual storage devices, thereby providing consistent and stable performance to each of the virtual storage devices.

While example embodiments have been illustrated and described above, it will be apparent to those skilled in the art that modifications and variations could be made without departing from the scope of the present inventive concept as defined by the appended claims.

What is claimed is:

1. An electronic system comprising:
a host including a virtual machine manager and a plurality of virtual machines; and
a storage device connected to the host, and including a nonvolatile memory device and a storage controller configured to control the nonvolatile memory device,
wherein the storage controller includes:
a buffer memory; and
a processor configured to:
provide a plurality of physical functions having equivalent authorities to the host, and
allocate, in response to a resource allocation request received from the host via an arbitrary physical function among the plurality of physical functions, a namespace provided by the nonvolatile memory device and a buffer region included in the buffer memory to a target physical function among the plurality of physical functions,
wherein the plurality of virtual machines are configured to:
request a resource allocation authority to the virtual machine manager, and
provide the resource allocation request to each of the plurality of physical functions, and
wherein the virtual machine manager is configured to:
map the plurality of physical functions to the plurality of virtual machines, and
provide the resource allocation authority to the plurality of virtual machines in response to the requested resource allocation authority from the plurality of virtual machines.

2. The electronic system of claim 1, wherein the resource allocation request represents a storage capacity and target quality of service (QOS) of the target physical function.

3. The electronic system of claim 2, wherein the processor is further configured to determine, based on the storage capacity represented by the resource allocation request, a size of the namespace to be allocated to the target physical function.

4. The electronic system of claim 2, wherein the processor is further configured to determine, based on the target QoS represented by the resource allocation request, a size of the buffer region allocated to the target physical function.

5. The electronic system of claim 2, wherein the processor is further configured to schedule, based on the target QOS of each of the plurality of physical functions, data input/output commands from the host for the respective plurality of physical functions.

6. The electronic system of claim 2, wherein the processor is further configured to determine, based on the target QoS represented by the resource allocation request, the number of command queues allocated to the target physical function.

7. The electronic system of claim 1, wherein the target physical function includes the arbitrary physical function.

8. The electronic system of claim 1, wherein the target physical function is different from the arbitrary physical function.

9. An electronic system comprising:
a host including a virtual machine manager and a plurality of virtual machines; and
a storage device connected to the host, and including a nonvolatile memory device and a storage controller configured to control the nonvolatile memory device,
wherein the storage controller includes:
a buffer memory; and
a processor configured to:
provide a plurality of physical functions to the host,
respectively allocate, in response to resource allocation requests received from the host via the plurality of physical functions, buffer regions having a size proportional to target quality of service (QOS) from the buffer memory to the plurality of physical functions,
monitor actual QOS of the plurality of physical functions, and
dynamically change sizes of the buffer regions respectively allocated to the plurality of physical functions according to whether target QoS of each of the plurality of physical functions is ensured as a result of the monitoring of the actual QoS,
wherein the plurality of virtual machines are configured to:
request a resource allocation authority to the virtual machine manager, and
provide the resource allocation requests to the plurality of physical functions, and
wherein the virtual machine manager is configured to:
map the plurality of physical functions to the plurality of virtual machines, and
provide the resource allocation authority to the plurality of virtual machines in response to the requested resource allocation authority from the plurality of virtual machines.

10. The electronic system of claim 9, wherein the processor is further configured to expand a buffer region allocated to a physical function having an actual QoS value less than a target QoS value, among the plurality of physical functions.

11. The electronic system of claim 9, wherein the processor is further configured to expand a buffer region allocated to a physical function, having a workload pattern concentrated on random read operations or random write operations, among the plurality of physical functions.

12. The electronic system of claim 9, wherein the processor is further configured to:
monitor an amount of usage of the buffer regions, and
based on a result of the monitoring of the amount of usage, recover a portion of a buffer region having a redundant buffer region, among the buffer regions.

13. The electronic system of claim 9, wherein the processor is further configured to:
fetch data input/output commands from the host for the respective plurality of physical functions to the buffer regions in an order scheduled based on the target QoS of each of the plurality of physical functions, and
process the fetched data input/output commands.

14. The electronic system of claim 9, wherein each of the plurality of physical functions has a general authority to process data input/output commands and a special authority to process the resource allocation requests.

15. A method of operating an electronic system including a host connected to a storage device, the method comprising:
identifying a storage device and acquiring information about an amount of resources of the storage device by a secure core of the host;
enumerating activated physical functions provided by the storage device;
mapping each of the activated physical functions to at least one virtual machine of the host by the secure core;
requesting a resource allocation authority to the secure core from the at least one virtual machine;
by the secure core, providing the resource allocation authority to the at least one virtual machine within a range of a resource budget for each of the activated physical functions in response to the requested resource allocation authority from the at least one virtual machine; and
providing, by the at least one virtual machine, a resource allocation request for setting a storage capacity and target QoS for at least one target physical function to a physical function mapped to the at least one virtual machine,
wherein the secure core and the at least one virtual machine are isolated from each other, and included in a memory region of the host.

16. The method of claim 15, further comprising:
providing, by the at least one virtual machine, a data input/output command to the mapped physical function.

17. The method of claim 15, wherein the providing of the resource allocation authority is executed by a manager running under a host operating system.

18. The method of claim 17, wherein the manager is a secure core running in a memory region, different from the at least one virtual machine.

19. The method of claim 17, further comprising:
determining, by the manager, a resource budget for a physical function mapped to the at least one virtual machine, based on a policy applied to a user using the at least one virtual machine.

20. The method of claim 15, wherein the information of the amount of resources of the storage device includes a storage capacity, maximum QoS, and the maximum number of namespaces providable by the storage device.

* * * * *